(12) United States Patent
Akhtyamova et al.

(10) Patent No.: US 12,380,125 B2
(45) Date of Patent: Aug. 5, 2025

(54) METHODS AND APPARATUSES TO RANK MULTIPLE RESULTS FROM MULTIPLE SEARCH ENGINES USING A FULLY CONNECTED NEURAL NETWORK

(71) Applicant: iCIMS, Inc., Holmdel, NJ (US)

(72) Inventors: Liliya Akhtyamova, Dublin (IE); Eoin O'Gorman, Cambridge (GB)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 18/408,937

(22) Filed: Jan. 10, 2024

(65) Prior Publication Data

US 2025/0061128 A1     Feb. 20, 2025

Related U.S. Application Data

(62) Division of application No. 18/452,064, filed on Aug. 18, 2023, now Pat. No. 11,971,899.

(51) Int. Cl.

| | |
|---|---|
| *G06F 16/20* | (2019.01) |
| *G06F 16/25* | (2019.01) |
| *G06F 16/9532* | (2019.01) |
| *G06F 16/9538* | (2019.01) |
| *G06Q 10/0631* | (2023.01) |
| *G06Q 10/1053* | (2023.01) |

(52) U.S. Cl.
CPC ........ *G06F 16/256* (2019.01); *G06F 16/9532* (2019.01); *G06F 16/9538* (2019.01); *G06Q 10/063112* (2013.01); *G06Q 10/1053* (2013.01)

(58) Field of Classification Search
CPC .. G06F 16/256; G06F 16/953; G06F 16/9532; G06F 16/9538; G06Q 10/063112; G06Q 10/1053
See application file for complete search history.

(56) References Cited

U.S. PATENT DOCUMENTS

| | | |
|---|---|---|
| 8,504,559 B1 | 8/2013 | Elman et al. |
| 8,818,910 B1 * | 8/2014 | Liu .................... G06Q 10/1053 705/321 |

(Continued)

OTHER PUBLICATIONS

[Author Unknown] "Schulze method" Wikipedia [online] https://en.wikipedia.org/wiki/Schulze_method (Access Dates: Sep. 13, 2023); 10 pages.

(Continued)

*Primary Examiner* — Diedra McQuitery
(74) *Attorney, Agent, or Firm* — Cooley LLP

(57) ABSTRACT

In an embodiment, a plurality of ballots (1) for a plurality of candidates, (2) generated by a plurality of search engines, and (3) for a job description are received. Each ballot from the plurality of ballots is generated by a search engine from the plurality of search engines different than remaining search engines from the plurality of search engines. A mathematical representation that indicates, for each candidate from the plurality of candidates, how many other candidates from the plurality of candidates that candidate was ranked higher than in the plurality of ballots is generated. A final ballot ranking the plurality of candidates is generated using a trained statistical model and based on the mathematical representation. A candidate from the plurality of candidates for the job description is identified based on the final ballot.

20 Claims, 6 Drawing Sheets

---

500

Receive a plurality of ballots (1) for a plurality of candidates,(2) generated by a plurality of search engines, and (3) for a job description, each ballot from the plurality of ballots generated by a search engine from the plurality of search engines different than remaining search engines from the plurality of search engines 502

↓

Generate a mathematical representation that indicates, for each candidate from the plurality of candidates, how many other candidates from the plurality of candidates that candidate was ranked higher than in the plurality of ballots 504

↓

Generate, using a trained statistical model and based on the mathematical representation, a final ballot ranking the plurality of candidates 506

↓

Identify a candidate from the plurality of candidates for the job description based on the final ballot 508

(56) References Cited

U.S. PATENT DOCUMENTS

| | | | |
|---|---|---|---|
| 11,971,899 B1 | 4/2024 | Akhtyamova et al. | |
| 2015/0347954 A1* | 12/2015 | Stern ............. | G06Q 10/063112 |
| | | | 705/7.14 |
| 2017/0161366 A1 | 6/2017 | Maitra et al. | |
| 2018/0060823 A1* | 3/2018 | Garimella .......... | G06Q 10/1053 |
| 2019/0019160 A1 | 1/2019 | Champaneria | |
| 2020/0402015 A1* | 12/2020 | Ozcaglar ............... | G06F 16/906 |
| 2021/0357872 A1 | 11/2021 | Gomez et al. | |
| 2022/0180323 A1 | 6/2022 | Di Sipio et al. | |

OTHER PUBLICATIONS

Csar, T. et al. "Computing the Schulze Method for Large-Scale Preference Data Sets," Proceedings of the Twenty-Seventh International Joint Conference on Artificial Intelligence (IJCAI-18), Jul. 2018, 180-187.

International Search Report and Written Opinion for PCT Application No. PCT/US2024/042703 mailed Oct. 25, 2024, 12 pages.

Mourão, A. et al., "Inverse square rank fusion for multimodal search," 2014 12th International Workshop on Content-Based Multimedia Indexing (CBMI), Klagenfurt, Austria. Published by the Institute of Electrical and Electronics Engineers (IEEE), Jun. 18, 2014, pp. 1-6.

* cited by examiner

| Number of candidates | Runtime (seconds) Full Schulze Method | Runtime (seconds) NN Approximative Method | Runtime improvement (%) |
| --- | --- | --- | --- |
| 50 | 0.0003 | 0.0002 | 33.33 |
| 100 | 0.0021 | 0.00003 | 85.71 |
| 250 | 0.032 | 0.001 | 96.88 |
| 500 | 0.22 | 0.0035 | 98.41 |
| 1000 | 1.8 | 0.0048 | 99.73 |
| 2000 | 16.5 | 0.0057 | 99.97 |

FIG. 1

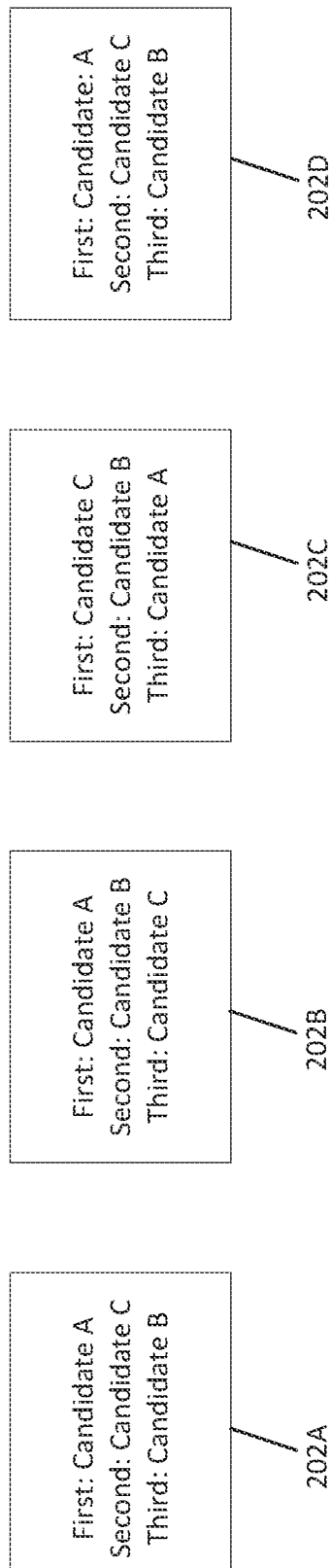
FIG. 2A
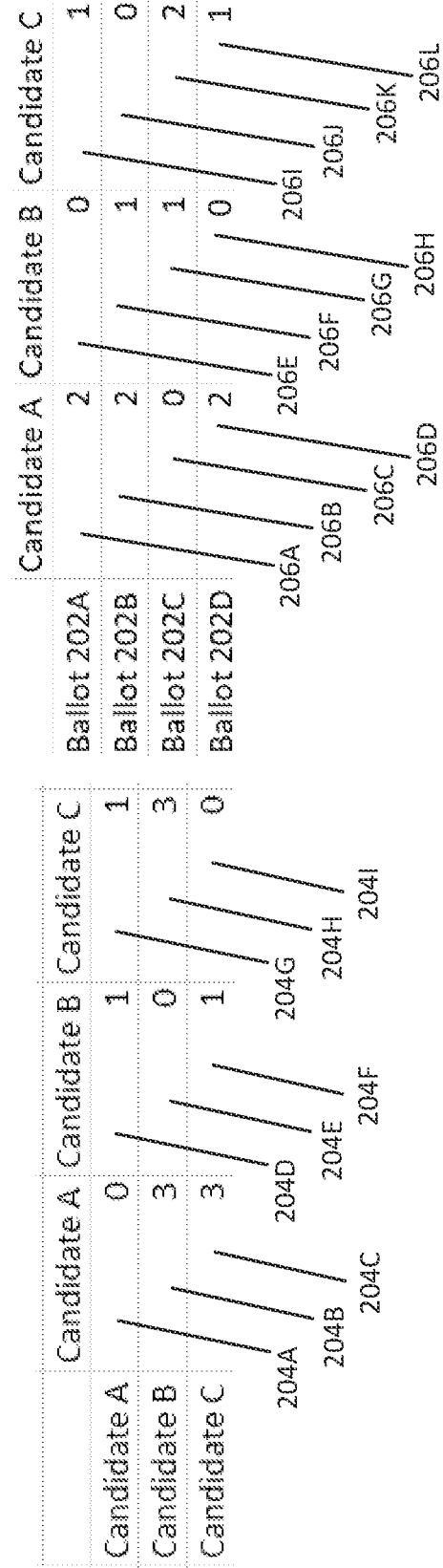
FIG. 2B
FIG. 2C

400

Receive a plurality of ballots from a plurality of search engines that includes $X$ number of search engines, $N$ being at least two, the plurality of ballots associated with $Y$ candidates, $Y$ being at least two, each ballot from the plurality of ballots (1) generated based on a search engine from the plurality of search engines different than remaining search engines from the plurality of search engines and (2) indicating how the search engine ranked the $Y$ candidates 402

Generate a mathematical representation based on the plurality of ballots, the mathematical representation having a size of $Y$ by $Y$, for each candidate from the $Y$ candidates and for each remaining candidate from the $Y$ candidates, the mathematical representation indicating a number of search engines from the $X$ search engines that ranked that candidate higher than that remaining candidate 404

Generate a normalized mathematical representation by dividing each value in the mathematical representation by $X$ 406

Generate a vector based on the normalized mathematical representation 408

Input the vector into a trained statistical model to generate an output 410

Cause a hiring action to occur in response to and based on the ranking the $Y$ candidates based on the output 414

FIG. 4

Receive a plurality of ballots (1) for a plurality of candidates, (2) generated by a plurality of search engines, and (3) for a job description, each ballot from the plurality of ballots generated by a search engine from the plurality of search engines different than remaining search engines from the plurality of search engines 502

Generate a mathematical representation that indicates, for each candidate from the plurality of candidates, how many other candidates from the plurality of candidates that candidate was ranked higher than in the plurality of ballots 504

Generate, using a trained statistical model and based on the mathematical representation, a final ballot ranking the plurality of candidates 506

Identify a candidate from the plurality of candidates for the job description based on the final ballot 508

Receive a first ballot for a plurality of candidates that is associated with a first search engine, the first search engine ranking a first candidate above a second candidate in the first ballot 602

Receive a second ballot for the plurality of candidates that is associated with a second search engine, the second search engine ranking the first candidate below the second candidate in the second ballot 604

Generate a mathematical representation that indicates that at least one search engine ranked the first candidate above the second candidate and at least one search engine ranked the second candidate above the first candidate 606

Execute a trained statistical model based on the mathematical representation to generate an output 608

Cause, automatically and without human interaction, a remedial action based on the output and in response to generating the output 610

FIG. 6

METHODS AND APPARATUSES TO RANK MULTIPLE RESULTS FROM MULTIPLE SEARCH ENGINES USING A FULLY CONNECTED NEURAL NETWORK

CROSS-REFERENCE TO RELATED APPLICATION

This application is a division of U.S. patent application Ser. No. 18/452,064, now U.S. Pat. No. 11,971,899, filed on Aug. 18, 2023, and entitled "Methods and Apparatuses to Rank Multiple Results From Multiple Search Engines Using A Fully Connected Neural Network," the disclosure of which is incorporated herein by reference in its entirety.

FIELD

One or more embodiments are related to methods and apparatuses to rank multiple results from multiple search engines using a fully-connected neural network.

BACKGROUND

When tackling search problems like candidate-to-job searches, job-to-candidate searches, candidate-to-candidate searches, job-to-job searches, and/or the like, it can be desirable to use multiple search engines then combine the results, because a search by a single search engine might be incomplete and/or inaccurate.

Election algorithms are sometimes used when combining results from multiple search engines. Known election algorithms, however, scale poorly. For example the Schulze method scales cubically as the number of candidates increases (e.g., when the number of candidates is doubled, the algorithm can take eight times as long to run). Accordingly, a better-scaled technique to combine the results of multiple search engines is desirable.

SUMMARY

In an embodiment, a method includes receiving a plurality of ballots from a plurality of search engines that includes X number of search engines, X being at least two. The plurality of ballots is associated with Y candidates, Y being at least two. Each ballot from the plurality of ballots is (1) generated based on a search engine from the plurality of search engines different than remaining search engines from the plurality of search engines and (2) indicates how the search engine ranked the Y candidates. The method further includes generating a mathematical representation based on the plurality of ballots, the mathematical representation having a size of Y by Y. For each candidate from the Y candidates and for each remaining candidate from the Y candidates, the mathematical representation indicates a number of search engines from the X search engines that ranked that candidate higher than that remaining candidate. The method further includes generating a normalized mathematical representation by dividing each value in the mathematical representation by X. The method further includes generating a vector based on the normalized mathematical representation. The method further includes inputting the vector into a trained statistical model to generate an output. The method further includes ranking the Y candidates based on the output. The method further includes causing a hiring action to occur in response to and based on the ranking the Y candidates based on the output.

In an embodiment, an apparatus includes a memory and a processor operatively coupled to the memory. The processor is configured to receive a plurality of ballots (1) for a plurality of candidates, (2) generated by a plurality of search engines, and (3) for a job description. Each ballot from the plurality of ballots is generated by a search engine from the plurality of search engines different than remaining search engines from the plurality of search engines. The processor is further configured to generate a mathematical representation that indicates, for each candidate from the plurality of candidates, how many other candidates from the plurality of candidates that candidate was ranked higher than in the plurality of ballots. The processor is further configured to generate, using a trained statistical model and based on the mathematical representation, a final ballot ranking the plurality of candidates. The processor is further configured to identify a candidate from the plurality of candidates for the job description based on the final ballot.

In an embodiment, a non-transitory processor-readable medium stores code representing instructions to be executed by a processor of a first compute device. The code comprises code to cause the processor to receive a first ballot for a plurality of candidates that is associated with a first search engine. The first search engine ranks a first candidate above a second candidate in the first ballot. The code further comprises code to cause the processor to receive a second ballot for the plurality of candidates that is associated with a second search engine. The second search engine ranks the first candidate below the second candidate in the second ballot. The code further comprises code to cause the processor to generate a mathematical representation that indicates that at least one search engine ranked the first candidate above the second candidate and at least one search engine ranked the second candidate above the first candidate. The code further comprises code to cause the processor to execute a trained statistical model based on the mathematical representation to generate an output. The code further comprises code to cause the processor to cause, automatically and without human interaction, a remedial action based on the output and in response to generating the output.

BRIEF DESCRIPTION OF THE DRAWINGS

FIG. 1 shows a table from an experiment comparing runtimes between implementations described herein and the Full Schulze method.

FIG. 2A shows an example of ballots for a job description, according to an embodiment.

FIG. 2B shows an example of a pairwise preference matrix generated based on the ballots shown in FIG. 2A, according to an embodiment.

FIG. 2C shows an example of a positional matrix generated based on the ballots shown in FIG. 2A, according to an embodiment.

FIG. 4 shows a flowchart of a method to rank multiple candidates based on multiple ballots from multiple search engines, according to an embodiment.

FIG. 5 shows a flowchart of a method to identify a candidates for a job description, according to an embodiment.

FIG. 6 shows a flowchart of a method to use a mathematical representation generated based on multiple ballots, according to an embodiment.

DETAILED DESCRIPTION

Figure 3:
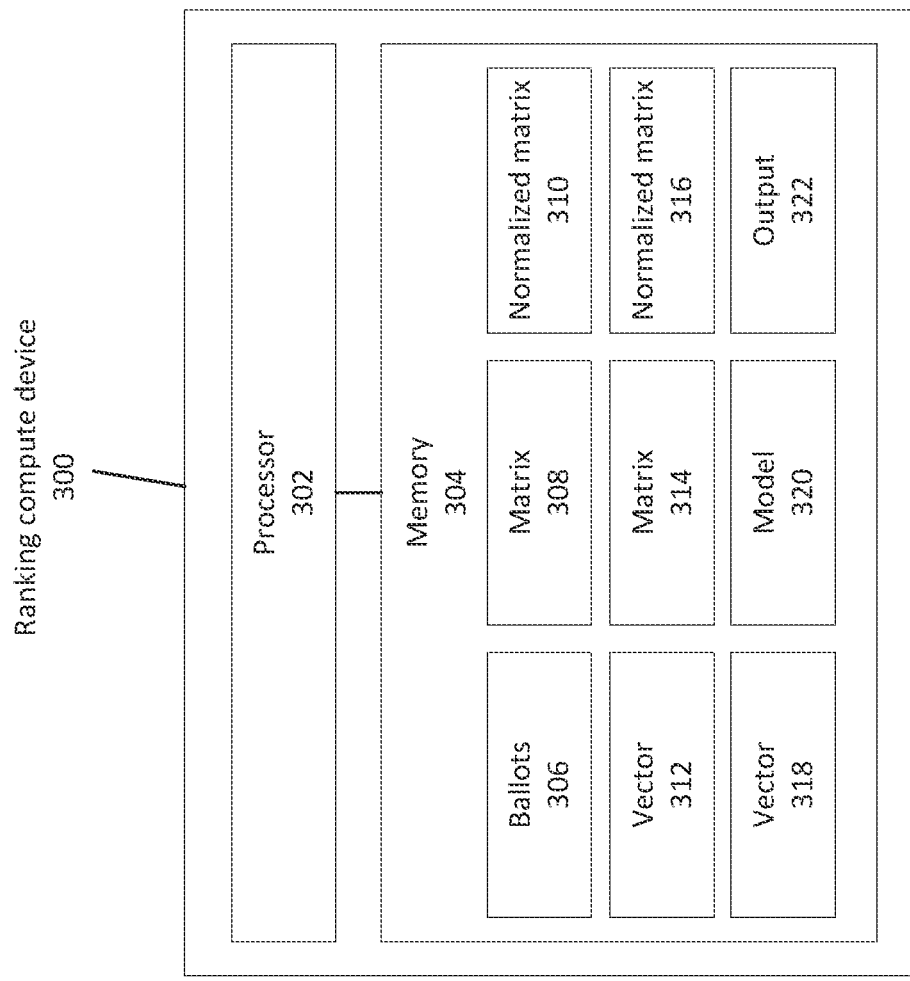
FIG. 3 shows a system block diagram of a ranking compute device configured to generate an output based on ballots generated by multiple different search engines, according to an embodiment.

Some implementations are related to data preprocessing and statistical model training that allows the trained statistical model to receive the outputs of multiple search engines' results to approximate election algorithms (either already existing or novel) at scales previously unfeasible. In some implementations, a preprocessing technique creates a pairwise preference matrix and optionally a positional matrix. Search engine results on their own, such as a list of ordered unique identifiers, can be unintelligible to a statistical model. Thus, in some implementations, an input with predetermined, reliable patterns that can be generalized to unseen examples is produced, allowing the statistical model to achieve very high accuracy on real and varied use cases.

In some implementations, standardized inputs and/or outputs suitable to any ranking system are produced; this not only allows for the approximation of a given election algorithm, but further allows the creation of novel election algorithms that scale linearly/quadratically. For example, both the Schulze method and the Ranked Pairs method (see, e.g., Csar, Theresa, Martin Lackner, and Reinhard Pichler. "Computing the Schulze Method for Large-Scale Preference Data Sets." IJCAI. 2018, which is incorporated herein by reference) can be useful algorithms that each have slightly different priorities. Thus, in some implementations, outputs ranked using each method can be used (e.g., alternated between) to produce a new election algorithm that blends both methods.

In some implementations, uncorrelated synthetic search engine results are used to train the statistical model. Thus, techniques described herein work even when no cross-search engine correlation exists, allowing search engines to be changed in the future without retraining the statistical model.

Some implementations are related to receiving multiple ballots from multiple search engines. For example, each search engine can provide a ballot ranking of candidates for a job opening; one or more vectors can then be generated based on the multiple ballots and input into a statistical model (e.g., a neural network) to generate an output that ranks candidates from the election. As another example, each search engine can provide a ballot ranking of job descriptions (e.g., job openings) for a candidate; one or more vectors can then be generated based on the multiple ballots and input into the statistical model to generate an output that ranks (e.g., from best match to worst match) the job descriptions for the candidate.

In some implementations, the candidates are humans. In some implementations, the candidates are humans looking for, nominated to, and/or applying to a job(s) (e.g., engineer, lawyer, teacher, cook, doctor, designer, human resources specialist, accountant, public official, etc.). In some implementations, the job description is for a job opening; the job description may include, for example, what the job is, what the qualification are, who the employer is, the location of the job, the number of people who have applied, what's required to apply to the job, and/or the like.

Some implementations better scale multi-engine search queries compared to known techniques. Some implementations are related to training a statistical model, such as a neural network, to calculate the result of an election (e.g., ranking the best jobs for a candidate, ranking the best candidates for a job, etc.). The statistical model can learn from, for example, thousands or millions of simulated elections and recognize statistical patterns that allow the statistical model to produce more accurate results without needing to calculate the entire election algorithm.

Compared to methods that scale cubically (or worse) as the number of candidates increases, some implementations are related to a statistical model that scales linearly (e.g., when the number of candidates is doubled, the algorithm can take twice as long to run). Accordingly, some implementations are related to running a multi-engine search query faster than known techniques.

Some known techniques that address efficiently computing election algorithms (e.g., Schulze algorithms) are different than implementations described herein. First, known techniques are limited to calculate only winners (i.e., top ranked result), while implementations described herein can determine the entire sequence of ranked candidates (i.e., from top ranked result to bottom ranked result) (which can be desirable in applications like candidate-to-job matching). Second, some known techniques need to be run on a multiple compute cores to realize full efficiency, whereas implementations herein can achieve full efficiency gains while running on a single compute core. Said differently, a processor can perform techniques described herein using only a single core. Single-core processors can draw less power than larger, multi-core processors (e.g., thereby saving battery power). Single core processors can also be made more cheaply than multi-core systems and used in embedded systems (e.g., robots, transport vehicles, traffic light controllers, medical imaging systems, etc.) that often have real-time performance constraints for safety, usability, and/or the like. More than 20 cores were used to run techniques discussed in Csar, Theresa, et al. "Computing the Schulze Method for Large-Scale Preference Data Sets." Proceedings of the Twenty-Seventh International Joint Conference on Artificial Intelligence, 2018, https://doi.org/10.24963/ijcai.2018/25. to achieve full efficiency, thereby limiting application to just those situations that can afford to use expensive specialty hardware of multiple computers (both of which incur complexity and financial cost). Third, techniques described herein can use an approximate statistical modeling approach (e.g., machine learning) that is more flexible and much faster than known methods (but occasionally e.g., less than 1% of the time inaccurate).

One advantage of techniques described herein compared to some known techniques is the computational efficiency and scalability. Some implementations herein have quadratic complexity, while other known approaches are P-complete (the P class stands for "polynomial time"). An advantage of a quadratic complexity machine learning-based modeling approach is computational feasibility, as quadratic complexity algorithms are computationally more efficient than P-complete algorithms, making them more practical for larger datasets and complex problems. Graph-based P-complete approaches, however, have limited scalability. While P-complete problems are theoretically solvable in polynomial time, the degree of the polynomial can be quite high. As the input size increases, the computation time can become prohibitively large even for moderately sized problems. Thus, in summary, an advantage of a quadratic complexity machine learning-based modeling approach lies in its relatively more efficient computation, making it suitable for larger datasets and practical implementation in real-world scenarios. On the other hand, graph-based P-complete problems may still have high polynomial degree computation, making them challenging to handle for larger and more complex instances, which can limit their applicability in certain situations.

FIG. 1 shows a table with experimental results comparing runtimes between an implementation(s) described herein and the Full Schulze method. Column 102 lists the number of candidates that were ranked by three different search engines. Column 104 lists the runtime that it took for the Full Schulze method to identify the top ranked candidate. Column 106 lists the runtime that it took for techniques described herein to rank each of the candidates. Column 108 indicates the runtime improvement. In addition to being able to rank all candidates instead of just identifying the top candidate, as can been seen in FIG. 1, one or more of the techniques described herein rank those candidates much faster. In the experiment, the full Schulze method results were generated by running the Schulze algorithm using the Go programming language and following a reference implementation provided in Wikipedia, while the NN approximative method results were generated by running the techniques described herein using the same Go programming language.

As previously discussed, multiple ballots can be received where each ballot can indicate a ranking generated by a different search engine. These ballots can be used to generate a pairwise preference matrix and optionally a positional matrix. These matrices can then be used to form a vector that is input into a trained statistical model to produce an output representing a final ranking. FIGS. 2A, 2B, and 2C illustrate examples of ballots and matrices that can be generated based on the ballots, according to an embodiment. FIG. 2A shows an example of ballots for a job description (e.g., job opening). Ballot 202A was generated by a first search engine and ranked candidate A first, candidate C second, and candidate B third. Ballot 202B was generated by a second search engine different than the first search engine and ranked candidate A first, candidate B second, and candidate C third. Ballot 202C was generated by a third search engine different than the first and second search engines and ranked candidate C first, candidate B second, and candidate A third. Ballot 202D was generated by a fourth search engine different than the first, second, and third search engines and ranked candidate A first, candidate C second, and candidate B third.

Ballots 202A, 202B, 202C, and 202D can be used to generate a pairwise preference matrix, shown at FIG. 2B. The number of rows and columns in the pairwise preference matrix correspond to the number of candidates included in ballots 202A, 202B, 202C, and 202D. Each row in the pairwise preference matrix is associated with a unique candidate, and each column in the pairwise preference matrix is associated with a unique candidate. For each element within the pairwise preference matrix, that element can indicate how many search engines ranked (i.e., preferred) the candidate associated with the column of that element higher than the candidate associated with the row of that element (or vice versa, where that element can indicate how many search engines ranked the candidate associated with the row of that element higher than the candidate associated with the column of that element). In FIG. 2B, element 204A is zero (i.e., null) because 0 ballots ranked candidate A higher than candidate A, element 204B is three because three ballots (i.e., ballots 202A, 202B, and 202D) ranked candidate A higher than candidate B, element 204C is three because three ballots (i.e., ballots 202A, 202B and 202D) ranked candidate A higher than candidate C, element 204D is one because one ballot (i.e., ballot 202C) ranked candidate B higher than candidate A, element 204E is one (i.e., null) because 0 ballots ranked candidate B higher than candidate B, element 204F is one because one ballot (i.e., ballot 202B) ranked candidate B higher than candidate C, element 204G is one because one ballot (i.e., ballot 202C) ranked candidate C higher than candidate A, element 204H is three because three ballots (i.e., ballots 202A, 202C, and 202D) ranked candidate C higher than candidate B, and element 202I is zero (i.e., null) because 0 ballots ranked candidate C higher than candidate C.

The pairwise preference matrix shown in FIG. 2B can then be normalized. In some instances, the pairwise preference matrix is normalized by dividing each value in the pairwise preference matrix by the total number of ballots/search engines used to generate the ballots (which in this example is four). In some instances, the pairwise preference matrix is normalized by dividing each value in the first matrix by the largest value in the matrix (which in this example is three).

A first vector can then be generated using the normalized pairwise preference matrix. The first vector can then be input into a statistical model, and the output can represent the ranking of the candidates.

In some implementations, where the row and column are associated with the same candidate, the value at that position can be deleted, ignored, not generated, and/or the like when generating the pairwise preference matrix, normalizing the pairwise preference matrix, and/or generating the first vector.

In some implementations, a positional matrix can be generated in addition to the pairwise preference matrix. Each row of the positional matrix can be associated with a unique ballot, and each column of the positional matrix can be associated with a unique candidate (or vice versa, where each column can be associated with a unique ballot and each row can be associated with a unique candidate). An example of the positional matrix is shown at FIG. 2C. The positional matrix shown in FIG. 2C includes a row associated with ballot 202A, a row associated with ballot 202B, a row associated with ballot 202C, and a row associated with ballot 202D. The positional matrix further includes a column associated with Candidate A, a column associated with Candidate B, and a column associated with Candidate C. Each element in the positional matrix can indicate how many spots (i.e., positions) away the candidate associated with that element was from last place in the ballot associated with that element. For example, as shown in FIG. 2C, element 206A is two because candidate A was ranked first in ballot 202A and thus two spots away from being in last place, element 206B is two because candidate A was ranked first in ballot 202B and thus two spots away from being in last place, element 206C is zero because candidate A was ranked third in ballot 202C and thus zero spots away from being in last place, element 206D is two because candidate A was ranked first in ballot 202D and thus two spots away from being in last place, element 206E is zero because candidate B was ranked third in ballot 202A and thus zero spots away from being in last place, element 206F is one because candidate B was ranked second in ballot 202B and thus one spot away from being in last place, element 206G is one because candidate B was ranked second in ballot 202C and thus one spot away from being in last place, element 206H is zero because candidate B was ranked third in ballot 202D and thus zero spots away from being in last place, element 206I is one because candidate C was ranked second in ballot 202A and thus one spot away from being in last place, element 206J is zero because candidate C was ranked third in ballot 202B and thus zero spots away from being in last place, element 206K is two because candidate C was ranked first in ballot 202C and thus two spots away from being in last place, and element 206L is one because candidate C was ranked second in ballot 202D and thus one spot away from being in last place.

Similar to the pairwise preference matrix shown in FIG. 2B, the positional matrix shown in FIG. 2C can then be normalized. In some instances, the positional matrix is normalized by dividing each value in the positional matrix by the total number of ballots/search engines used to generate the ballots (which in this example is four). In some instances, the positional matrix is normalized by dividing each value in the positional matrix by the largest value in the matrix (which in this example is two).

A second vector can then be generated using the normalized positional matrix. The second vector can then be input into the statistical model along with the first vector to generate the output representing the ranking of the candidates.

Note that FIGS. 2A, 2B, and 2C are an example, and variations can occur. For example, techniques described herein can be used for any number of ballots and for any number of candidates. As another example, although the positional matrix in FIG. 2C indicated the number of positions a candidate was from last place, in other implementations, the positional matrix can indicate the number of positions a candidate was from a first place. As another example, although the pairwise preference matrix in FIG. 2B was zero where the row and column of an element were for the same candidate (e.g., elements 204A, 204E, and 204I), in some implementations, a non-zero value can be used (e.g., null or −1). As another example, although the pairwise preference matrix in FIG. 2B showed integers, in some implementations, values in the pairwise preference matrix can be a real number (e.g., if a search engine preferred two candidate equally their associated value in the pairwise preference matrix can be 0.5). Additionally, any representation that indicates the information in FIGS. 2B and 2C can be used instead of a matrix, such as arrays, fields, or tensors. In some implementations, each ballot ranks the same set of candidates. In some implementations, some ballots rank candidates that other ballots do not rank.

In some implementations, some ballots have candidates that other ballots don't have. In such a case, the pairwise preference matrix can still be generated using the same logic. For example, if a first engine/ballot ranked (from first to last) candidate A followed by candidate B followed by candidate C and a second engine/ballot ranked (from first to last) candidate A followed by candidate B followed by candidate C, the pairwise preference matrix can indicate that one engine (the first engine) preferred candidate C over candidate D and a different engine (the second engine) preferred candidate D over candidate C (note that in this case where the ballots include candidates A, B, C, and D, the pairwise preference will include four rows and four columns to account for the four candidates that were included in at least one ballot). Moreover, where some ballots have candidates that other ballots don't have, all candidates not voted on by a ballot/engine are treated as coming in joint-last place in the positional matrix.

FIG. 3 shows a system block diagram of a ranking compute device 300 configured to generate an output based on ballots generated by multiple different search engines, according to an embodiment. Ranking compute device 300 can be any type of compute device, such as a server, desktop computer, laptop computer, tablet, phone, and/or the like. Ranking compute device 300 includes processor 302 operatively coupled to memory 304 (e.g., via a system bus).

Processor 302 can be, for example, a hardware-based integrated circuit (IC) or any other suitable processing device configured to run and/or execute a set of instructions or code. For example, processor 302 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 302 can be configured to run any of the methods and/or portions of methods discussed herein.

Memory 304 can be, for example, a random-access memory (RAM), a memory buffer, a hard drive, a read-only memory (ROM), an erasable programmable read-only memory (EPROM), and/or the like. Memory 304 can be configured to store any data used by the processors to perform the techniques (methods, processes, etc.) discussed herein. In some instances, memory 304 can store, for example, one or more software programs and/or code that can include instructions to cause the processors to perform one or more processes, functions, and/or the like. In some implementations, memory 304 can include extendible storage units that can be added and used incrementally. In some implementations, memory 304 can be a portable memory (for example, a flash drive, a portable hard disk, and/or the like) that can be operatively coupled to the processors. In some instances, memory 304 can be remotely operatively coupled with a compute device (not shown in FIG. 3).

Memory 304 includes (e.g., stores) a representation of ballots 306. Ballots 306 can include a plurality of ballots for a search query, such as one of candidates for one job description or job descriptions for one candidate. Each ballot in ballots 306 can indicate a ranking or preference of something, such as candidates for a job descriptions, job descriptions for a candidate, and/or the like. Each ballot in ballots 306 can be generated by a different search engine. For example, a first ballot from ballots 306 can be generated by a first search engine that identified and ranked a first set of job descriptions for a candidate, a second ballot from ballots 306 can be generated by a second search engine that identified and ranked either the same first set of job descriptions or a different set of job descriptions for the same candidate, and so on. As another example, a first ballot from ballots 306 can be generated by a first search engine that identified and ranked a first set of candidates for a job description, a second ballot from ballots 306 can be generated by a second search engine that identified and ranked either the same first set of candidates or a different set of candidate for the same job description, and so on. Ballots 202A, 202B, 202C, and 202D from FIG. 2A are examples of ballots 306.

In some implementations, ballots 306 are received (e.g., in real time and without human intervention) from multiple different compute devices not shown in FIG. 1. For example, each ballot from ballots 306 may be received from a different compute device.

Memory 304 further includes (e.g., stores) matrix 308. Matrix 308 can be a pairwise preference matrix generated based on ballots 306 and indicate, for each item (e.g., candidate, job description, etc.) listed in ballots 306, how many ballots from ballots 306 (i.e., search engines) preferred that item over a different item listed in ballots 306. The pairwise preference matrix from FIG. 2B is an example of matrix 308. In some implementations, where ballot 306 included votes for P number of candidates (even if some candidates were included in some ballots but not other ballots), matrix 308 can include P rows and P columns; said differently, each candidate that received a vote from at least one ballot from ballots 306 can be associated with a row and column at matrix 308.

Memory 304 further includes (e.g., stores) normalized matrix 310. Normalized matrix 310 can be generated based on matrix 308. In some implementations, normalized matrix 310 is generated by dividing each value in matrix 308 by the number of ballots in ballots 306. In some implementations, normalized matrix 310 is generated by dividing each value in matrix 308 by the largest value included in matrix 308.

Memory 304 further includes (e.g., stores) vector 312. Vector 312 can be a single vector that represents and is generated based on normalized matrix 310. For example, normalized matrix 310 can be flattened to generate vector 312. Flattening normalized matrix 310 to generate vector 312 can include reducing the dimensionality of normalize matrix 310 (e.g., to one dimension). For example, if normalized matrix includes a first row with values [0.5, 0.25] and a second row with values [0, 0.75], vector 312 can be [0.5, 0.25, 0, 0.75].

Memory 304 further includes (e.g., stores) matrix 314. Matrix 314 can be a positional matrix generated based on ballots 306 and indicate, for each item (e.g., candidate, job description, etc.) listed in each ballot from ballots 306, the position of that item in that ballot relative to other items in that ballot (e.g., how many spots that item is from last place in that ballot, how many spots that item is from first place in that ballot, etc.). The positional matrix from FIG. 2C is an example of matrix 314.

Memory 304 further includes (e.g., stores) normalized matrix 316. Normalized matrix 316 can be generated based on matrix 314. In some implementations, normalized matrix 316 is generated by dividing each value in matrix 314 by the number of search engines used to train model 320. In some implementations, normalized matrix 316 is generated by dividing each value in matrix 314 by the number of ballots in ballots 306. In some implementations, normalized matrix 314 is generated by dividing each value in matrix 314 by the largest value included in matrix 314. Memory 304 further includes (e.g., stores) vector 312. Vector 312 can be a single vector that represents and is generated based on normalized matrix 310.

Memory 304 further includes (e.g., stores) model 320. Model 320 can be any type of statistical model, such as a tree-based regression model (e.g., Random Forest, XGBoost, CatBoost, etc.), probabilistic model (e.g., hidden Markov model, maximum entropy Markov model, conditional random forest, etc.), recurrent neural network (e.g., long short term memory network), transformer model with self-attention mechanism, and/or the like. In some implementations, model 320 does not use a rules-based approach; instead, model 320 uses an approximate statistical modeling approach (e.g., machine learning). Although using a rules-based approach may result in more accuracy, techniques described herein are much faster, more flexible, and have been shown to achieve ~99% accuracy.

Vectors 312 and 318 can be input to model 320 to produce output 322. Output 322 can indicate a final ranking of ballots 306. By model 320 taking into account results from multiple different search engines, output 322 can be more accurate and complete than, for example, the results from a single search engine. In some instances, output 322 additionally or alternatively lists a score indicating preference; for example, a higher score can indicate a greater match while a lower score can indicate a lesser match.

In some instances, a length (e.g., total number of values) of output 322 is different than a length of vector 312 and/or a length of vector 318. For example, if ballots 306 includes Y different candidates from X different search engines, the length of vector 312 can be Y×Y, the length of vector 318 can be Y×X, and the length of output 322 can be Y. In some implementations, if ballots 306 includes Y different candidates and values from rows and columns associated with the same candidate are removed, the length of vector 312 can be Y×Y−Y.

In some implementations, model 320 was trained using training data generated by simulated search engines that rank, for example, one of candidates or job descriptions at random. By using simulated search engines (e.g., that take in a list of randomly generated candidates and sort them at random), there is no correlation between simulated search engines during training. Having no correlation ensures that any combination of search engines used to generate ballots 306 in runtime (e.g., after training) will not be more complex (e.g., less instances of engine correlation; all engines ranking candidates in the same order would be less complex while all engines ranking candidates in a way with no common relationship would be more complex) than combinations of search engines used during training. In some implementations, the random ranking of is done using multiple different election algorithms (e.g., Schulze method and Ranked Pairs method), allowing model 320 to learn novel election algorithms during training.

In some implementations, the number of different types of candidates or job descriptions used to train model 320 is equal to or greater than the number of candidates or job descriptions included in ballots 306. For example, if model 320 was only trained using ballots that ranked five candidates, ballots 306 does not include more than five candidates. As another example, if model 320 was only trained using ballots that ranked 10,000 job descriptions, ballots 306 does not include more than 10,000 job descriptions.

In some implementations, matrix 314, normalized matrix 316, and vector 318 are not generated and/or not used to generate output 322. Rather, only vector 312 is provided to model 320 to generate output 322. When matrix 314, normalized matrix 316, and vector 318 is generated and used, however, the number of ballots in ballots 306 is not greater than the number of simulated search engines used to train model 320.

In some implementations, output 322 can cause an action, such as a hiring action. For example, if output 322 ranks candidates for a job, an indication of the top candidate(s) can be sent to the candidate(s) (e.g., notifying the candidate(s) of the job offer, notifying the candidate(s) of being selected for an interview, recommending the candidate(s) to apply), the job poster, a recruiter, and/or the like. As another example, if output 322 ranks jobs for a candidate, an indication of the top job(s) can be sent to the candidate, the job poster of the top job(s), a recruiter associated with the top job(s), and/or the like. As another example, if output 322 indicates scores for candidates for a job opening and the top score(s) are less than a predetermined threshold, a recommendation can be sent to the candidates (e.g., add more detail into their profile, obtain a certain experience or skill, apply for a different job, etc.). As another example, if output 322 indicates scores for job openings to which a candidate could apply but the top score(s) are less than a predetermined threshold, a recommendation can be sent to the candidate (e.g., broaden their job search).

In some implementations, ballots 306 can be compared to output 322 for trends and determining how search engines perform. For example, some search engines may generate ballots that are more similar to output 322 than other search engines. In some implementations, search engines that generated ballots that are more similar to output 322 can be assigned a better score while search engines that generated ballots that are less similar to output 322 can be assigned a worse score. In some implementations, those search engines that produce ballots more similar to output 322 (e.g., those search engines that have better scores) can be used to obtain future ballots for future elections while those search engines that produce ballots less similar to output 322 (e.g., those search engines that have lower scores) can be replaced and/or not used to obtain future ballots for those future elections.

Although FIG. 3 shows a single compute device, in some implementations, functionalities of ranking compute device 300 can be performed across a plurality of compute devices interconnected by a communications network(s) (not shown). For example, ballots, 306, matrix 308, normalized matrix 310, vector 312, matrix 314, normalized matrix 316, and vector 318 may be stored at a first compute device, and model 320 and output 322 can be stored at a second compute device different than the first compute device.

Although some implementations above were discussed in the context of matrices, in other implementations, any mathematical representation that represents the pairwise preference information (and positional information when used) can be used. Examples of mathematical representations includes matrices, groups of arrays, fields, tensors, and/or the like.

Although ranking compute device 300 received ballots 306 for a single search query, ranking compute device 300 can receive additional ballots for additional search queries. For example, ranking compute device 300 can receive a first set of ballots for identifying candidates to a first job description, a second set of ballots for identifying candidates to a second job description, a third set of ballots for identifying job descriptions for a candidate, and so on.

FIG. 4 shows a flowchart of a method 400 to rank multiple candidates based on multiple ballots from multiple search engines, according to an embodiment. In some implementations, method 400 is performed by a processor (e.g., processor 302 and/or a processor not shown in FIG. 3).

At 402, a plurality of ballots (e.g., ballot 202A, ballot 202B, ballot 202C, ballot 202D, ballots 306) is received from a plurality of search engines that includes X number of search engines. X is at least two. The plurality of ballots associated with (e.g., includes) Y candidates, with Y being at least two. Each ballot from the plurality of ballots (1) is generated based on a search engine from the plurality of search engines different than remaining search engines from the plurality of search engines and (2) indicates how the search engine ranked the Y candidates. The plurality of ballots can be received at the same time or over a period of time.

At 404, a mathematical representation (e.g., pairwise preference matrix in FIG. 2B, matrix 308) is generated based on the plurality of ballots. The mathematical representation has a size of Y by Y (i.e., Y rows and Y columns). For each candidate from the Y candidates and for each remaining candidate from the Y candidates, the mathematical representation indicates a number of search engines from the X search engines that ranked that candidate higher than that remaining candidate. In some implementations, 404 occurs automatically (e.g., without human intervention) in response to completing 402. Examples of mathematical representations includes matrices, groups of arrays, fields, tensors, and/or the like.

At 406, a normalized mathematical representation (e.g., normalized matrix 310) is generated by dividing each value in the mathematical representation by X. In some implementations, 406 occurs automatically (e.g., without human intervention) in response to completing 404.

At 408, a vector (e.g., vector 312) is generated based on the normalized mathematical representation. In some implementations, 408 occurs automatically (e.g., without human intervention) in response to completing 406.

At 410, the vector is input into a trained statistical model (e.g., model 320) to generate an output (e.g., output 322). The output indicates a ranking for the Y candidates. In some implementations, 410 occurs automatically (e.g., without human intervention) in response to completing 408.

At 412, a hiring action is caused to occur in response to and based on the ranking. The hiring action could be, for example, causing a top-ranked candidate(s) from the Y candidates to be hired or recommended (e.g., via email) to apply, notifying lower-ranked candidates from the Y candidates that they will not be hired or are not recommended to apply, and/or the like. In some implementations, 414 occurs automatically (e.g., without human intervention) in response to completing 412.

In some implementations of method 400, the mathematical representation is a first mathematical representation, the normalized mathematical representation is a first normalized mathematical representation, and the vector is a first vector. Some implementations further comprise generating a second mathematical representation (e.g., positional matrix in FIG. 2C, matrix 314) based on the plurality of ballots. The second mathematical representation has a size of X by Y (e.g., X rows and Y columns, or X columns and Y rows). The second mathematical representation indicates, for each search engine from the plurality of search engines and for each candidate from the Y candidates, how that search engine ranked that candidate at the ballot (1) from the plurality of ballots and (2) associated with that search engine. Some implementations further comprise generating a normalized second mathematical representation by dividing each value in the second mathematical representation by Z. Z indicates a number of search engines used to train the trained statistical model. Some implementations further include generating a second vector based on the normalized second mathematical representation, the inputting at 410 further including inputting the second vector into the trained statistical model to generate the output.

In some implementations of method 400, the trained statistical model is a fully-connected neural network. Herein, a fully-connected neural network can refer to a neural network in which each neuron applies a linear transformation to the input vector through a weights mathematical representation; as a result, all possible connections layer-to-layer are present, meaning every input of the input vector influences every output of the output vector.

In some implementations of method 400, the plurality of ballots is received from a plurality of remote compute devices (e.g., compute devices that are in wireless communication with ranking compute device 300) without human interaction. For example, each remote compute device from the plurality of compute devices can include a search engine from the plurality of search engines different than each remaining remote compute device from the plurality of compute devices.

In some implementations of method 400, method 400 is performed on a single compute core. In some implementations, a processor (e.g., processor 302) performing method 400 has a single core.

In some implementations of method 400, the Y candidates are candidates for a job description and the hiring action at 414 includes identifying a candidate from the Y candidates for the job description. The candidate may be, for example, the top ranked candidate.

In some implementations of method 400, the plurality of search engines is a first plurality of search engines, the plurality of ballots is a first plurality of ballots, the mathematical representation is a first mathematical representation, the normalized mathematical representation is a first normalized mathematical representation, the vector is a first vector, and the output is a first output. Some implementations further include training a statistical model (e.g., model 320) to generate the trained statistical model. Some implementations further include receiving a second plurality of ballots from a second plurality of search engines having a Z number of search engines. Search engines in the Z search engines are different than search engines in the X search engines (in some implementations, search engines in the Z search engines are different than search engines in the X search engines in that they are mutually exclusive, while in other implementations search engines in the Z search engines are different than search engines in the X search engines in the sense that one of the Z search engines or the X search engines includes a search engine that the other does not). Z is at least two. The second plurality of ballots is associated with N number of candidates, N being at least two. Each ballot from the second plurality of ballots (1) is generated based on a search engine from the second plurality of search engines different than remaining search engines from the second plurality of search engines and (2) indicates how the search engine ranked the N candidates. Some implementations further include generating a second mathematical representation based on the second plurality of ballots, the mathematical representation having a size N by N. For each candidate from the N candidates and for each remaining candidate from the N candidates, the second mathematical representation indicates a number of search engines from the second plurality of search engines that ranked that candidate higher than that remaining candidate. Some implementations further include generating a second normalized mathematical representation by dividing each value in the second mathematical representation by Z. Some implementations further include generating a second vector based on the second normalized mathematical representation. Some implementations further include inputting the second vector to the trained statistical model to generate a second output. The second output indicates a ranking of the N candidates. The trained statistical model was not trained after training the statistical model to generate the trained statistical model and before the inputting the second vector to the trained statistical model.

FIG. 5 shows a flowchart of a method 500 to identify a candidates for a job description, according to an embodiment. In some implementations, method 500 is performed by a processor (e.g., processor 302 and/or a processor not shown in FIG. 3).

At 502, a plurality of ballots (e.g., ballots 306) (1) for a plurality of candidates, (2) generated by a plurality of search engines, and (3) for a job description (e.g., job opening) are received. Each ballot from the plurality of ballots is generated by a search engine from the plurality of search engines different than remaining search engines from the plurality of search engines. The plurality of ballots can be received at the same time or over a period of time.

At 504, a mathematical representation (e.g., pairwise preference matrix in FIG. 2B, matrix 308) is generated that indicates, for each candidate from the plurality of candidates, how many other candidates from the plurality of candidates that candidate was ranked higher than in the plurality of ballots. In some implementations, 504 occurs automatically (e.g., without human intervention) in response to completing 502. Examples of mathematical representations includes matrices, groups of arrays, fields, tensors, and/or the like.

At 506, a final ballot (e.g., output 322) ranking the plurality of candidates is generated using a trained statistical model (e.g., model 320) and based on the mathematical representation. In some implementations, 506 occurs automatically (e.g., without human intervention) in response to completing 504.

At 508, a candidate from the plurality of candidates is identified for the job description based on the final ballot. The candidate may be, for example, the top ranked candidate in the final ballot. In some implementations, 508 occurs automatically (e.g., without human intervention) in response to completing 506.

In some implementations of method 500, the mathematical representation is a first mathematical representation. Some implementations further include generating a second mathematical representation (e.g., positional matrix in FIG. 2C, matrix 314) that indicates where each candidate from the plurality of candidates was ranked at each ballot from the plurality of ballots relative to remaining candidates from the plurality of candidates at that ballot. The final ballot is further generated at 506 based on the second mathematical representation.

In some implementations of method 500, the mathematical representation is a first mathematical representation, the plurality of candidates includes a Y number of candidates, and the plurality of search engines includes an X number of search engines. Some implementations further include generating a second mathematical representation (e.g., positional matrix in FIG. 2C, matrix 314) that indicates where each candidate from the plurality of candidates was ranked at each ballot from the plurality of ballots relative to remaining candidates from the plurality of candidates at that ballot. The final ballot is further generated at 506 based on the second mathematical representation. The second mathematical representation includes one of X rows or X columns and one of Y rows or Y columns (i.e., the second mathematical representation includes X rows and Y columns, the second mathematical representation includes X columns and Y rows). Each row or column from the one of X rows or X columns is associated with a search engine from the plurality of search engines different than remaining search engines from the plurality of search engines. Each row or column from the one of Y rows or Y columns is associated with a candidate from the plurality of candidates different than remaining candidates from the plurality of candidates.

In some implementations of method 500, the plurality of candidates includes a Y number of candidates. The mathematical representation includes Y rows and Y columns. Each row from the Y rows is associated with a candidate from the plurality of candidates different than remaining candidates from the plurality of candidates, and each column from the Y columns is associated with a candidate from the plurality of candidates different than remaining candidates from the plurality of candidates.

In some implementations of method 500, the final ballot is generated based on the mathematical representation at 506 by dividing each value in the mathematical representation by a count of the plurality of search engines to generate a normalized mathematical representation, flattening the normalized mathematical representation into a vector, and inputting the vector into the trained statistical model to generate an output representing the final ballot.

In some implementations of method 500, the plurality of candidates is a first plurality of candidates. The trained statistical model is generated by generating a training dataset using an election algorithm and a plurality of simulated search engines configured to rank a second plurality of candidates at random, and training a statistical model (e.g., model 320) based on the training dataset to generate the trained statistical model.

In some implementations of method 500, the plurality of candidates is a first plurality of candidates. The trained statistical model is generated by generating a training dataset using a plurality of election algorithms and a plurality of simulated search engines configured to rank a second plurality of candidates at random, and training a statistical model (e.g., model 320) based on the training dataset to generate the trained statistical model.

FIG. 6 shows a flowchart of a method 600 to use a mathematical representation generated based on multiple ballots, according to an embodiment. In some implementations, method 600 is performed by a processor (e.g., processor 302 and/or a processor not shown in FIG. 3).

At 602, a first ballot (e.g., ballot 202A, a first ballot from ballots 306) for a plurality of candidates that is associated with a first search engine is received. The first search engine ranked a first candidate above a second candidate in the first ballot. In some implementations, the first ballot is received automatically (e.g., without human intervention) and in real time from a first remote compute device.

At 604, a second ballot (e.g., ballot 202B, a second ballot from ballots 306) for the plurality of candidates that is associated with a second search engine is received. The second search engine ranked the first candidate below the second candidate in the second ballot. In some implementations, the second ballot is received automatically (e.g., without human intervention) and in real time from a second remote compute device. In some implementations, 604 occurs automatically (e.g., without human intervention) in response to completing 602.

At 606, a mathematical representation (e.g., pairwise preference matrix in FIG. 2B, matrix 308) is generated that includes indication that at least one search engine ranked the first candidate above the second candidate and at least one search engine ranked the second candidate above the first candidate. In some implementations, 606 occurs automatically (e.g., without human intervention) in response to completing 604. Examples of mathematical representations includes matrices, groups of arrays, fields, tensors, and/or the like.

At 608, a trained statistical model (e.g., model 320) is executed based on the mathematical representation to generate an output (e.g., output 322). In some implementations, 608 occurs automatically (e.g., without human intervention) in response to completing 606.

At 610, a remedial action is caused, automatically and without human interaction, based on the output and in response to generating the output. The remedial action could be, for example, causing someone to be hired, causing someone to not be hired, and/or the like. Causing someone to be hired or not hired may include, for example, sending a message (e.g., email, text message, automated voice call, etc.) to a compute device of the person to be hired indicating that they've been hired or offered for hire, sending a message to a compute device of the person(s) not to be hired indicating that they won't be hired, updating a database indicating the person to be hired for subsequent viewing by the hiring employer, and/or the like. In some implementations, 610 occurs automatically (e.g., without human intervention) in response to completing 608.

In some implementations of method 600, the mathematical representation is a first mathematical representation, the normalized mathematical representation is a first normalized mathematical representation, and the vector is a first vector. Some implementations further include generating a second mathematical representation (e.g., positional matrix in FIG. 2C, matrix 314) that indicates where the first candidate was ranked relative to the remaining candidates on the first ballot, where the second candidate was ranked relative to the remaining candidates on the first ballot, where the first candidate was ranked relative to the remaining candidates on the second ballot, and where the second candidate was ranked relative to the remaining candidates on the second ballot. Executing the trained model at 608 is further based on the second mathematical representation.

In some implementations, of method 600, the trained statistical model is a fully-connected neural network.

Some implementations of method 600 further include training a statistical model (e.g., model 320) using synthetic results generated by a plurality of synthetic search engines to generate the trained statistical model.

In some implementations of method 600, the plurality of candidates further includes a third candidate, the first ballot ranks the third candidate above the first candidate, the second ballot ranks the third candidate above the second candidate, and the mathematical representation further indicates that (1) at least two search engines ranked the third candidate above the first candidate and (2) at least two search engines ranked the third candidate about the second candidate.

In some implementations of method 600, the statistical model is a machine learning (ML) model. An ML model can learn rules before and after deployment (e.g., without relying on a human to provide the additional rules after deployment). The statistical model does not use a rules-based approach. A rules-based approach may refer to, for example, an approach that involves generating rules (e.g., hand coded by a human) for a model to follow before deployment of the model. After deployment of the model, however, a model using a rules-based approach has little to no capability to learn additional rules unless, for example, a human hand codes new rules.

Although some implementations herein were discussed in the context of jobs and candidates, techniques described herein can be applied in any settings such as ranking restaurants, ranking hotels, ranking products, and/or ranking results for any search query.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the embodiments, "set" can refer to zero or more in some implementations, one or more in some implementations, and two or more in some implementations.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. An apparatus, comprising:
a memory; and
a processor operatively coupled to the memory, the processor configured to:
receive a plurality of ballots (1) for a plurality of candidates, (2) generated by a plurality of search engines, and (3) for a job description, each ballot from the plurality of ballots generated by a search engine from the plurality of search engines different than remaining search engines from the plurality of search engines;
generate a mathematical representation that indicates, for each candidate from the plurality of candidates, how many other candidates from the plurality of candidates that candidate was ranked higher than in the plurality of ballots;
generate, using a trained statistical model and based on the mathematical representation, a final ballot ranking the plurality of candidates; and
identify a candidate from the plurality of candidates for the job description based on the final ballot.

2. The apparatus of claim 1, wherein the mathematical representation is a first mathematical representation and the processor is further configured to:
generate a second mathematical representation that indicates where each candidate from the plurality of candidates was ranked at each ballot from the plurality of ballots relative to remaining candidates from the plurality of candidates at that ballot,
the processor configured to generate the final ballot further based on the second mathematical representation.

3. The apparatus of claim 1, wherein the mathematical representation is a first mathematical representation, the plurality of candidates includes a Y number of candidates, the plurality of search engines includes an X number of search engines, and the processor is further configured to:
generate a second mathematical representation that indicates where each candidate from the plurality of candidates was ranked at each ballot from the plurality of ballots relative to remaining candidates from the plurality of candidates at that ballot,
the processor configured to generate the final ballot further based on the second mathematical representation,
the second mathematical representation associated with one of X rows or X columns and one of Y rows or Y columns, each row or column from the one of X rows or X columns associated with a search engine from the plurality of search engines different than remaining search engines from the plurality of search engines, each row or column from the one of Y rows or Y columns associated with a candidate from the plurality of candidates different than remaining candidates from the plurality of candidates.

4. The apparatus of claim 1, wherein the plurality of candidates includes a Y number of candidates, the mathematical representation is associated with Y rows and Y columns, each row from the Y rows is associated with a candidate from the plurality of candidates different than remaining candidates from the plurality of candidates, and each column from the Y columns is associated with a candidate from the plurality of candidates different than remaining candidates from the plurality of candidates.

5. The apparatus of claim 1, wherein the processor is configured to generate the final ballot based on the mathematical representation by:
dividing each value in the mathematical representation by a count of the plurality of search engines to generate a normalized mathematical representation;
flattening the normalized mathematical representation into a vector; and
inputting the vector into the trained statistical model to generate an output representing the final ballot.

6. The apparatus of claim 1, wherein the plurality of candidates is a first plurality of candidates and the processor is configured to generate the trained statistical model by:
generating a training dataset using an election algorithm and a plurality of simulated search engines configured to rank a second plurality of candidates at random; and
training a statistical model based on the training dataset to generate the trained statistical model.

7. The apparatus of claim 1, wherein the plurality of candidates is a first plurality of candidates and the processor is configured to generate the trained statistical model by:
generating a training dataset using a plurality of election algorithms and a plurality of simulated search engines configured to rank a second plurality of candidates at random; and training a statistical model based on the training dataset to generate the trained statistical model.

8. A non-transitory processor-readable medium storing code representing instructions to be executed by a processor of a first compute device, the code comprising code to cause the processor to:
  receive a plurality of ballots (1) for a plurality of candidates, (2) generated by a plurality of search engines, and (3) for a job description, each ballot from the plurality of ballots generated by a search engine from the plurality of search engines different than remaining search engines from the plurality of search engines;
  generate a mathematical representation that indicates, for each candidate from the plurality of candidates, how many other candidates from the plurality of candidates that candidate was ranked higher than in the plurality of ballots;
  generate, using a trained statistical model and based on the mathematical representation, a final ballot ranking the plurality of candidates; and
  identify a candidate from the plurality of candidates for the job description based on the final ballot.

9. The non-transitory processor-readable medium of claim 8, wherein the mathematical representation is a first mathematical representation and the code further comprises code to cause the processor to:
  generate a second mathematical representation that indicates where each candidate from the plurality of candidates was ranked at each ballot from the plurality of ballots relative to remaining candidates from the plurality of candidates at that ballot,
  the code to generate the final ballot further based on the second mathematical representation.

10. The non-transitory processor-readable medium of claim 8, wherein the mathematical representation is a first mathematical representation, the plurality of candidates includes a Y number of candidates, the plurality of search engines includes an X number of search engines, and the code further comprises code to cause the processor to:
  generate a second mathematical representation that indicates where each candidate from the plurality of candidates was ranked at each ballot from the plurality of ballots relative to remaining candidates from the plurality of candidates at that ballot,
  the code to generate the final ballot further based on the second mathematical representation,
  the second mathematical representation associated with one of X rows or X columns and one of Y rows or Y columns, each row or column from the one of X rows or X columns associated with a search engine from the plurality of search engines different than remaining search engines from the plurality of search engines, each row or column from the one of Y rows or Y columns associated with a candidate from the plurality of candidates different than remaining candidates from the plurality of candidates.

11. The non-transitory processor-readable medium of claim 8, wherein the plurality of candidates includes a Y number of candidates, the mathematical representation is associated with Y rows and Y columns, each row from the Y rows is associated with a candidate from the plurality of candidates different than remaining candidates from the plurality of candidates, and each column from the Y columns is associated with a candidate from the plurality of candidates different than remaining candidates from the plurality of candidates.

12. The non-transitory processor-readable medium of claim 8, wherein the code to generate the final ballot based on the mathematical representation includes code to:
  divide each value in the mathematical representation by a count of the plurality of search engines to generate a normalized mathematical representation;
  flatten the normalized mathematical representation into a vector; and
  input the vector into the trained statistical model to generate an output representing the final ballot.

13. The non-transitory processor-readable medium of claim 8, wherein the plurality of candidates is a first plurality of candidates and the code to generate the trained statistical model includes code to:
  generate a training dataset using an election algorithm and a plurality of simulated search engines configured to rank a second plurality of candidates at random; and
  train a statistical model based on the training dataset to generate the trained statistical model.

14. The non-transitory processor-readable medium of claim 8, wherein the plurality of candidates is a first plurality of candidates and the code to generate the trained statistical model includes code to:
  generate a training dataset using a plurality of election algorithms and a plurality of simulated search engines configured to rank a second plurality of candidates at random; and
  train a statistical model based on the training dataset to generate the trained statistical model.

15. A method, comprising:
  receiving a plurality of ballots (1) for a plurality of candidates, (2) generated by a plurality of search engines, and (3) for a job description, each ballot from the plurality of ballots generated by a search engine from the plurality of search engines different than remaining search engines from the plurality of search engines;
  generating a mathematical representation that indicates, for each candidate from the plurality of candidates, how many other candidates from the plurality of candidates that candidate was ranked higher than in the plurality of ballots;
  generating, using a trained statistical model and based on the mathematical representation, a final ballot ranking the plurality of candidates; and
  identifying a candidate from the plurality of candidates for the job description based on the final ballot.

16. The method of claim 15, further comprising:
  generating a second mathematical representation that indicates where each candidate from the plurality of candidates was ranked at each ballot from the plurality of ballots relative to remaining candidates from the plurality of candidates at that ballot,
  the generating the final ballot further based on the second mathematical representation.

17. The method of claim 15, wherein the mathematical representation is a first mathematical representation, the plurality of candidates includes a Y number of candidates, the plurality of search engines includes an X number of search engines, the method further comprising:
  generating a second mathematical representation that indicates where each candidate from the plurality of candidates was ranked at each ballot from the plurality of ballots relative to remaining candidates from the plurality of candidates at that ballot,
  the generating the final ballot further based on the second mathematical representation, the second mathematical representation associated with one of X rows or X columns and one of Y rows or Y columns, each row or column from the one of X rows or X columns associated with a search engine from the plurality of search engines different than remaining search engines from the plurality of search engines, each row or column from the one of Y rows or Y columns associated with a candidate from the plurality of candidates different than remaining candidates from the plurality of candidates.

18. The method of claim 15, wherein the plurality of candidates includes a Y number of candidates, the mathematical representation is associated with Y rows and Y columns, each row from the Y rows is associated with a candidate from the plurality of candidates different than remaining candidates from the plurality of candidates, and each column from the Y columns is associated with a candidate from the plurality of candidates different than remaining candidates from the plurality of candidates.

19. The method of claim 15, wherein the generating the final ballot based on the mathematical representation further includes:
  dividing each value in the mathematical representation by a count of the plurality of search engines to generate a normalized mathematical representation;
  flattening the normalized mathematical representation into a vector; and
  inputting the vector into the trained statistical model to generate an output representing the final ballot.

20. The method of claim 15, wherein the plurality of candidates is a first plurality of candidates, the generating the trained statistical model further includes:
  generating a training dataset using an election algorithm and a plurality of simulated search engines configured to rank a second plurality of candidates at random; and
  training a statistical model based on the training dataset to generate the trained statistical model.

* * * * *